H. W. PLEISTER AND J. KARITZKY.
CABLE CLAMP AND BRIDLE RING.
APPLICATION FILED OCT. 4, 1919.
1,381,227.  Patented June 14, 1921.
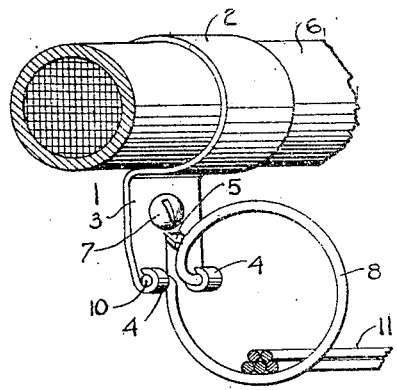
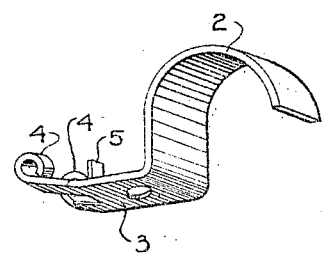
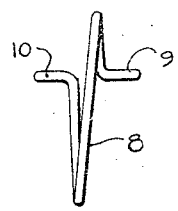
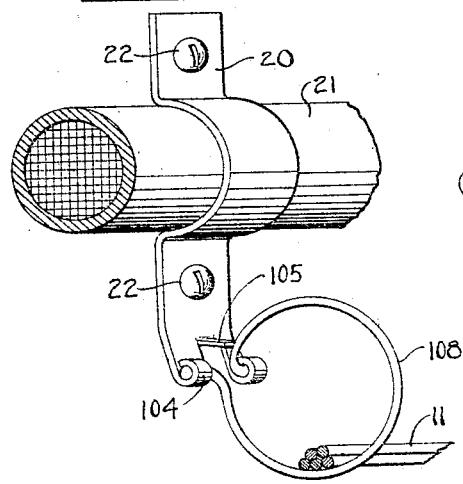
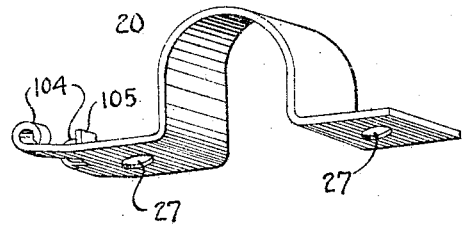
Inventors
Henry W. Pleister
John Karitzky
By their Attorney

UNITED STATES PATENT OFFICE.

HENRY W. PLEISTER, OF WESTFIELD, AND JOHN KARITZKY, OF GARWOOD, NEW JERSEY, ASSIGNORS TO HENRY B. NEWHALL, JR., EXECUTOR OF HENRY B. NEWHALL, DECEASED.

CABLE-CLAMP AND BRIDLE-RING.

1,381,227.   Specification of Letters Patent.   Patented June 14, 1921.

Application filed October 4, 1919. Serial No. 328,530.

*To all whom it may concern:*

Be it known that we, HENRY W. PLEISTER, a citizen of the United States, residing at Westfield, in the county of Union and State of New Jersey, and JOHN KARITZKY, a citizen of the United States, residing at Garwood, in the county of Union and State of New Jersey, have invented certain new and useful Improvements in Cable-Clamps and Bridle-Rings, of which the following is a specification, taken in connection with the accompanying drawings.

Our invention relates to a combined conduit and cable clamp and bridle ring, and also to the cable or conduit clamp as a sub-combination or article of manufacture.

Our invention further relates to a cable and conduit clamp which can be manufactured at minimum expense and to which a bridle ring may be secured either at the original installation of the cable and conduit clamp, or at any future time when it may be desirable to support one or more runs of bridle wire. It further relates to the combination of a conduit and cable clamp and a bridle ring which is unthreaded, and which will form a complete closed loop around the bridle wire or strands of bridle wires, and thereby prevent any accidental disengagement of the bridle wire from the bridle ring.

Our invention further relates to certain combinations, sub-combinations, articles of manufacture, and details of construction all of which will be more fully hereinafter described and pointed out in the claims.

In the figures, in which we have shown different embodiments of our invention, the same reference numerals refer to similar parts in the several figures.

Figure 1 is a perspective view of our combined cable clamp and bridle ring, a cable and strands of bridle wires;

Fig. 2 is a perspective view of the cable and conduit clamp shown in Fig. 1;

Fig. 3 is a detail plan view of the bridle ring;

Fig. 4 is a perspective view showing a modification in which our combined cable clamp and bridle ring is used as a two hole cable clamp;

Fig. 5 is a perspective view of the two hole conduit and cable clamp shown in Fig. 4.

Previous to our invention bridle rings have been used with conduit and cable clamps. These bridle rings are what are known as "pig-tail", having one of their ends provided with machine screw threads to coöperate with machine female screw threads in the heel of the cable clamp. This has necessitated an extra thickness of metal in the heel of the conduit or cable clamp so as to provide sufficient female threads to support the shank of the commercial pig-tail bridle ring. When the cable clamp was formed of sheet metal the customary way to get this additional thickness of metal in the heel was to bend over sufficient additional metal to double the thickness of the metal in the heel. This necessitated the use of a large additional quantity of sheet metal with the consequent increase in cost of the resulting cable or conduit clamp.

In the commercial use of conduit and cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By our invention our conduit and cable clamp may be used as a separate article of manufacture or sub-combination, and then later, when the needs of the service demands it, our bridle ring may be supported by the same conduit or cable clamp, when the complete combination would be used.

By our invention we form our cable clamp 1 preferably of sheet metal and provide it with a hook 2 and heel 3, both of the same minimum thickness, so as to reduce the cost of manufacture. In one form of our invention, that shown in Figs. 1 and 2, we slot the lower end of the heel, forming two prongs, which are bent back on themselves to form the bearings 4, 4. Preferably, though not necessarily, we at the same time provide the heel 3 with a bent up stop or finger 5, though this may be omitted.

The cable and conduit clamp 1 is used to support the cable 6 in the ordinary manner against a wall or other support by the securing screw 7. Weeks, months or years later, when it may be desirable to increase the service by stringing additional wires, this may be accomplished at minimum expense by our invention, by attaching our bridle ring 8, having the arms 9, 10 to the bearings 4, 4 of the conduit or cable clamp 1. This can be easily done by placing the arm 9 in one of the bearings 4, for example, and then compressing the bridle ring 8 so that the other arm 10 will spring into the other bearing 4, as shown in Fig. 1. The bridle wires 11, 11 can then be strung through the bridle rings 8.

Preferably we provide the cable clamp with the stop or finger 5, which bearing on the ring 8 near the arm 9 serves to act as a stop and limit the movement of the bridle ring 8 within the bearings 4, 4 thereby holding it steady and in its proper position.

Our invention can also be used as a two-hole conduit or cable clamp. In Figs. 4 and 5 we have shown a two-hole cable clamp 20 supporting the cable 21. This clamp is secured in position by the two screws 22, 22 passing through the two holes 27, 27 and is provided with bearings 104, 104 and preferably, though not necessarily, with a stop or finger 105 to coöperate with the bridle ring 108. The operation is the same as the corresponding parts 4, 5 and 8, described in connection with Fig. 1 of the drawings.

It will be noted that in our improved construction there is but one minimum thickness of metal in the heel of the conduit or cable clamp; that no tapping or screw threading of the heel is required; that no screw threads on the bridle ring are necessary or desirable; that much thinner and lighter wire can be used to form our bridle ring than can be used in the ordinary commercial form of pig-tail bridle ring; and that a closed loop is formed around the strands of bridle wires so that they cannot become disengaged from the bridle ring; and that our bridle ring can, in both of our forms shown, be attached to the different conduit or cable clamps without loosening the securing screw and by simple manipulation.

Having thus described this invention in connection with illustrative embodiments thereof, to the details of which we do not desire to be limited, what is claimed as new and what is desired to secure by Letters Patent is set forth in the appended claims.

What we claim is:—

1. A conduit and cable clamp having a hook portion and a heel portion, the heel portion being provided with bearings for a bridle ring and provided with a finger or stop.

2. A conduit and cable clamp having a hook portion and a heel portion, the heel portion being slotted and bent to form bearings for a bridle ring and a stop or finger to coöperate with a bridle ring.

3. A conduit and cable clamp having a hook portion and a heel portion, the heel portion being provided with bearings for a bridle ring and provided with a finger or stop, and a bridle ring coöperating with the bearings and with the finger or stop.

4. A conduit and cable clamp formed of sheet metal having a hook portion and a heel portion of one thickness of metal, the heel portion being slotted and bent to form bearings for a bridle ring and an integral finger or stop to position said ring.

HENRY W. PLEISTER.
JOHN KARITZKY.

Witnesses:
A. M. WILLIAMS,
M. R. RYAN.